(12) United States Patent
Vilermo et al.

(10) Patent No.: US 10,542,368 B2
(45) Date of Patent: Jan. 21, 2020

(54) AUDIO CONTENT MODIFICATION FOR PLAYBACK AUDIO

(71) Applicant: Nokia Technologies Oy, Espoo (FI)

(72) Inventors: Miikka Tapani Vilermo, Siuro (FI); Arto Juhani Lehtiniemi, Lempaala (FI); Lasse Juhani Laaksonen, Tampere (FI); Mikko Tapio Tammi, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/937,248

(22) Filed: Mar. 27, 2018

(65) Prior Publication Data
US 2019/0306651 A1    Oct. 3, 2019

(51) Int. Cl.
*H04S 7/00* (2006.01)
*G06F 3/01* (2006.01)
*G06F 3/0481* (2013.01)
*G06T 19/00* (2011.01)

(52) U.S. Cl.
CPC .............. *H04S 7/303* (2013.01); *G06F 3/011* (2013.01); *G06F 3/04815* (2013.01); *G06T 19/006* (2013.01); *H04S 2400/11* (2013.01)

(58) Field of Classification Search
CPC ...... H04S 7/303; H04S 2400/11; G06F 3/011; G06F 3/04815; G06T 19/006
See application file for complete search history.

(56) References Cited

U.S. PATENT DOCUMENTS

| 5,633,993 | A | 5/1997 | Redmann |
| 5,754,939 | A | 5/1998 | Herz |
| 6,151,020 | A | 11/2000 | Palmer |
| 6,330,486 | B1 | 12/2001 | Padula |
| 7,266,207 | B2 | 9/2007 | Wilcock et al. |
| 7,492,915 | B2 | 2/2009 | Jahnke |

(Continued)

FOREIGN PATENT DOCUMENTS

| EP | 2688318 A1 | 1/2014 |
| GB | 2540175 A | 1/2017 |

(Continued)

OTHER PUBLICATIONS

Hatala, Marek et al., "Ontology-Based User Modeling in an Augmented Audio Reality System for Museums", http://citeseerx.ist.psu.edu/viewdoc/download?doi=10.1.1.91.5712&rep=rep1&type=pdf; Aug. 29, 2016, 38 pgs.

(Continued)

*Primary Examiner* — Mark Fischer
(74) *Attorney, Agent, or Firm* — Harrington & Smith

(57) ABSTRACT

A method including accessing, by a user device, a location corresponding to at least one microphone array in a content of a free-viewpoint audio environment. The method includes tracking user movement of a user based on a user position in the content of the free-viewpoint audio environment, determining a probability of error in a direction estimate from at least one part of an audio signal; and applying audio ambience to the at least one part of the audio signal based on the user displacement from the nearest microphone array of the at least one microphone array and the probability of error in the direction estimate from the at least one part of the audio signal.

18 Claims, 12 Drawing Sheets

(56) References Cited

U.S. PATENT DOCUMENTS

| | | | |
|---|---|---|---|
| 8,187,093 B2 | 5/2012 | Hideya et al. | |
| 8,189,813 B2 | 5/2012 | Muraoka et al. | |
| 8,411,880 B2 | 4/2013 | Wang et al. | |
| 8,509,454 B2 | 8/2013 | Kirkeby et al. | |
| 8,831,255 B2 | 9/2014 | Crawford et al. | |
| 8,990,078 B2 | 3/2015 | Nakadai et al. | |
| 9,161,147 B2 | 10/2015 | Korn | |
| 9,179,232 B2 | 11/2015 | Jarske et al. | |
| 9,197,979 B2 | 11/2015 | Lemieux et al. | |
| 9,215,539 B2 | 12/2015 | Kim et al. | |
| 9,271,081 B2 | 2/2016 | Corteel et al. | |
| 2002/0150254 A1 | 10/2002 | Wilcock et al. | |
| 2006/0025216 A1 | 2/2006 | Smith | |
| 2008/0144864 A1 | 6/2008 | Huon | |
| 2008/0247567 A1 | 10/2008 | Kjolerbakken et al. | |
| 2009/0138805 A1 | 5/2009 | Hildreth | |
| 2009/0262946 A1 | 10/2009 | Dunko | |
| 2010/0098274 A1 | 4/2010 | Hannemann et al. | |
| 2010/0119072 A1 | 5/2010 | Ojanpera | |
| 2010/0208905 A1 | 8/2010 | Franck et al. | |
| 2011/0002469 A1 | 1/2011 | Ojala | |
| 2011/0129095 A1 | 6/2011 | Avendano et al. | |
| 2011/0166681 A1 | 7/2011 | Lee et al. | |
| 2012/0027217 A1 | 2/2012 | Jun et al. | |
| 2012/0230512 A1 | 9/2012 | Ojanpera | |
| 2012/0232910 A1 | 9/2012 | Dressler et al. | |
| 2012/0295637 A1* | 11/2012 | Hannuksela | G01S 3/8034 455/456.1 |
| 2013/0114819 A1 | 5/2013 | Melchior et al. | |
| 2013/0259243 A1 | 10/2013 | Herre et al. | |
| 2013/0321586 A1 | 12/2013 | Kirk et al. | |
| 2014/0010391 A1 | 1/2014 | Ek et al. | |
| 2014/0133661 A1 | 5/2014 | Harma et al. | 381/22 |
| 2014/0153753 A1 | 6/2014 | Crockett | 381/307 |
| 2014/0285312 A1 | 9/2014 | Laaksonen et al. | |
| 2014/0328505 A1 | 11/2014 | Heinemann | |
| 2014/0350944 A1 | 11/2014 | Jot et al. | |
| 2015/0002388 A1 | 1/2015 | Weston et al. | |
| 2015/0003616 A1 | 1/2015 | Middlemiss et al. | |
| 2015/0055937 A1 | 2/2015 | Van Hoff et al. | |
| 2015/0063610 A1 | 3/2015 | Mossner | |
| 2015/0078594 A1 | 3/2015 | Mcgrath et al. | 381/300 |
| 2015/0116316 A1 | 4/2015 | Fitzgerald et al. | |
| 2015/0146873 A1 | 5/2015 | Chabanne et al. | 7/305 |
| 2015/0223002 A1 | 8/2015 | Mehta et al. | 7/30 |
| 2015/0245153 A1 | 8/2015 | Malak | 381/57 |
| 2015/0263692 A1 | 9/2015 | Bush | |
| 2015/0302651 A1 | 10/2015 | Shpigelman | |
| 2015/0316640 A1 | 11/2015 | Jarske et al. | |
| 2016/0050508 A1 | 2/2016 | Redmann | 381/303 |
| 2016/0084937 A1 | 3/2016 | Lin | |
| 2016/0112819 A1 | 4/2016 | Melmert et al. | |
| 2016/0125867 A1 | 5/2016 | Jarvinen et al. | |
| 2016/0142830 A1 | 5/2016 | Hu | |
| 2016/0150267 A1 | 5/2016 | Strong | |
| 2016/0150345 A1 | 5/2016 | Jang | |
| 2016/0192105 A1 | 6/2016 | Breebaart et al. | |
| 2016/0212272 A1 | 7/2016 | Srinivasan et al. | |
| 2016/0227337 A1 | 8/2016 | Goodwin et al. | |
| 2016/0227338 A1 | 8/2016 | Oh et al. | |
| 2016/0266865 A1 | 9/2016 | Tsingos et al. | |
| 2016/0300577 A1 | 10/2016 | Fersch et al. | |
| 2016/0313790 A1 | 10/2016 | Clement et al. | |
| 2017/0077887 A1 | 3/2017 | You | |
| 2017/0110155 A1 | 4/2017 | Campbell et al. | |
| 2017/0150252 A1 | 5/2017 | Trestain et al. | |
| 2017/0165575 A1 | 6/2017 | Ridihalgh et al. | |
| 2017/0169613 A1 | 6/2017 | VanBlon et al. | |
| 2017/0208415 A1 | 7/2017 | Ojala | |
| 2017/0223478 A1 | 8/2017 | Jot et al. | |
| 2017/0230760 A1 | 8/2017 | Sanger et al. | |
| 2017/0295446 A1 | 10/2017 | Thagadur Shivappa | |
| 2017/0366914 A1 | 12/2017 | Stein et al. | |

FOREIGN PATENT DOCUMENTS

| | | |
|---|---|---|
| WO | WO-2009092060 A2 | 7/2009 |
| WO | WO-2009128859 A1 | 10/2009 |
| WO | WO-2011020065 A1 | 2/2011 |
| WO | WO-2011020067 A1 | 2/2011 |
| WO | WO-2013/064943 A1 | 5/2013 |
| WO | WO-2014168901 A1 | 10/2014 |
| WO | WO-2015152661 A1 | 10/2015 |
| WO | WO-2016014254 A1 | 1/2016 |
| WO | WO-2017120681 A1 | 7/2017 |

OTHER PUBLICATIONS

Gunel, Banu et al., "Spatial Synchronization of Audiovisual Objects by 3D Audio Object Coding", IEEE 2010, pp. 460-465; https://www.researchgate.net/profile/E_Ekmekcioglu/publication/251975482_Spatial_synchronization_of_audiovisual_objects_by_3D_audio_object_coding/links/54e783660cf2f7aa4d4d858a.pdf >; 2010.

"Unity 3D Audio"; Nov. 8, 2011; whole document (9 pages).

Wozniewski, M. et al.; "User-Specific Audio Rendering and Steerable Sound for Distributed Virtual Environments"; Proceedings of the 13$^{th}$ International Conference on Auditory Display; Montréal, Canada; Jun. 26-29, 2007; whole document (4 pages).

Galvez, Marcos F. Simon; Menzies, Dylan; Mason, Rusell; Fazi, Filippo Maria "Object-Based Audio Reproduction Using a Listener-Position Adaptive Stereo System" University of Southhampton <http://www.aes.org/e-lib/browse,cfm?elib=18516>.

Simon Galvez, Marcos F.; Menzies, Dylan; Fazi, Filippo Maria; de Campos, Teofilo; Hilton, Adrian "A Listener Position Adaptive Stereo System for Object-Based Reproduction" http://www.aes.org/e-lib/browse.cfm?elib=17670 dated May 6, 2015.

Micah T. Taylor, Anish Chandak, Lakulish Antani, Dinesh Manocha, "*RESound: Interactive Sound Rendering for Dynamic Virtual Enviroments*" MM'09, Oct. 19-24, 2009, Beijing, China. http://gamma.cs.unc.edu/Sound/RESound/.

Cameron Faulkner, "*Google's Adding Immersive Audio to your Virtual Reality Worlds*" http://www.in.techradar.com/news/misc/googlesaddingimmersiveaudiotoyourvrworlds/articleshow/57191578.cms retrieved Feb. 16, 2017.

Alessandro Pieropan, Giampiero Salvi, Karl Pauwels, Hedvig Kjellstrom Audio-Visual Classification and Detection of Human Manipulation Actions [https://www.csc.kth.se/-hedvig/publications/iros_14.pdf] retrieved Sep. 29, 2017.

Anil Camci, Paul Murray, Angus Graeme Forbes, "*A Web-based UI for Designing 3D Sound Objects and Virtual Sonic Enviroments*" Electronic Visualization Laboratory, Department of Computer Science, University of Illinois at Chicago retrieved May 16, 2017.

Henney Oh "The Future of VR Audio-3 Trends to Track This Year" dated Jul. 4, 2017.

Carl Schissler, Aaron Nicholls, and Ravish Mehra "Efficient HRTF-Based Spatial Audio for Area and Volumetric Sources" [retrieved Jan. 31, 2018].

Hasan Khaddour, Jiri Schimmel, Frantisek Rund "A Novel Combined System of Direction Estimation and Sound Zooming of Multiple Speakers" Radioengineering, vol. 24, No. 2, Jun. 2015.

Li, Loco Radio Designing High Density Augmented Reality Audio Browsers, PhD Thesis Final, MIT, 2014.

\* cited by examiner

1200 

1210: device accesses location corresponding to at least one microphone array in a content of a free-viewpoint audio environment

1220: device tracks user movement of a user based on a user position in the content of the free-viewpoint audio environment

1230: determine user displacement from a nearest microphone array of the at least one microphone array

1240: determine a probability of error in a direction estimate from at least one part of an audio signal

1250: apply audio ambience to the at least one part of the audio signal based on the user displacement from the nearest microphone array of the at least one microphone array and the probability of error in the direction estimate from the at least one sound source

AUDIO CONTENT MODIFICATION FOR PLAYBACK AUDIO

BACKGROUND

Technical Field

The exemplary and non-limiting embodiments relate to spatial audio playback.

Brief Description of Prior Developments

Spatial audio playback may be implemented in six degree of freedom (6dof) environments. Moving Picture Experts Group I (MPEG-I) and 3GPP standardization work are known to focus on three degree of freedom (3dof). With regard to spatial audio for recorded 6dof content, 3dof content may be recorded in several locations and then interpolated between those locations.

SUMMARY

The following summary is merely intended to be exemplary. The summary is not intended to limit the scope of the claims.

In accordance with one aspect, an example method comprises accessing, by a user device, a location corresponding to at least one microphone array in a content of a free-viewpoint audio environment. The method includes tracking user movement of a user based on a user position in the content of the free-viewpoint audio environment, determining a probability of error in a direction estimate from at least one part of an audio signal; and applying audio ambience to the at least one part of the audio signal based on the user displacement from the nearest microphone array of the at least one microphone array and the probability of error in the direction estimate from the at least one part of the audio signal.

In accordance with another aspect, an example apparatus comprises at least one processor; and at least one non-transitory memory including computer program code, the at least one memory and the computer program code configured to, with the at least one processor, cause the apparatus to: access a location corresponding to at least one microphone array in a content of a free-viewpoint audio environment, track user movement of a user based on a user position in the content of the free-viewpoint audio environment, determine a probability of error in a direction estimate from at least one sound source, and apply audio ambience to the at least one sound source based on the user displacement from the nearest microphone array of the at least one microphone array and the probability of error in the direction estimate from the at least one sound source.

In accordance with another aspect, an example apparatus comprises a non-transitory program storage device readable by a machine, tangibly embodying a program of instructions executable by the machine for performing operations, the operations comprising: accessing, by a user device, a location corresponding to at least one microphone array in a content of a free-viewpoint audio environment; tracking user movement of a user based on a user position in the content of the free-viewpoint audio environment; determining a probability of error in a direction estimate from at least one sound source; and applying audio ambience to the at least one sound source based on the user displacement from the nearest microphone array of the at least one microphone array and the probability of error in the direction estimate from the at least one sound source.

BRIEF DESCRIPTION OF THE DRAWINGS

The foregoing aspects and other features are explained in the following description, taken in connection with the accompanying drawings, wherein:

FIG. 12 illustrates an example method.

DETAILED DESCRIPTION OF EMBODIMENTS

Figure 1:
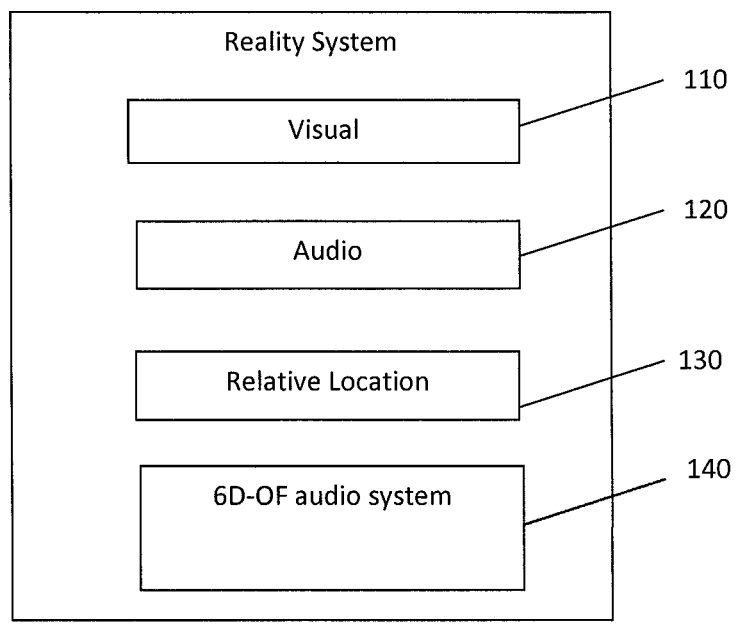
FIG. 1 is a diagram illustrating a reality system comprising features of an example embodiment.

Referring to FIG. 1, a diagram is shown illustrating a reality system 100 incorporating features of an example embodiment. The reality system 100 may be used by a user for augmented-reality (AR), virtual-reality (VR), or presence-captured (PC) experiences and content consumption, for example, which incorporate free-viewpoint audio. Although the features described may be used to implement the example embodiments shown in the drawings, it should be understood that features can be embodied in many alternate forms of embodiments.

The system 100 generally comprises a visual system 110, an audio system 120, a relative location system 130 and an enhanced 6dof audio system 140. The visual system 110 is configured to provide visual images to a user. For example, the visual system 110 may comprise a virtual reality (VR) headset, goggles or glasses. The audio system 120 is configured to provide audio sound to the user, such as by one or more speakers, a VR headset, or ear buds for example. The relative location system 130 is configured to sense a location of the user, such as the user's head for example, and determine the location of the user in the realm of the reality content consumption space. The movement in the reality content consumption space may be based on actual user movement, user-controlled movement, and/or some other externally-controlled movement or pre-determined movement, or any combination of these. The user is able to move and turn their head in the content consumption space of the free-viewpoint. The relative location system 130 may be able to change what the user sees and hears based upon the user's movement in the real-world; that real-world movement changing what the user sees and hears in the free-viewpoint rendering.

The enhanced 6dof audio system 140 is configured to implement a process providing enhanced 6dof audio. The enhanced 6dof audio system 140 may implement methods, components and systems as described herein below with respect to FIGS. 2 to 12.

Figure 2:
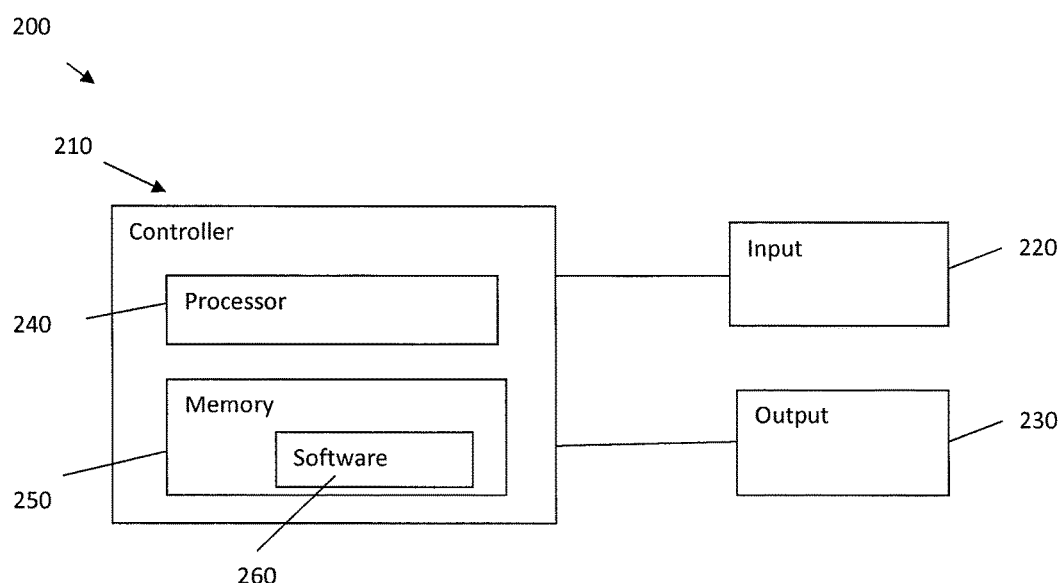
FIG. 2 is a diagram illustrating some components of the system shown in FIG. 1.

Referring also to FIG. 2, a system 200 generally comprises one or more controllers 210, one or more inputs 1320 and one or more outputs 230. The input(s) 220 may comprise, for example, location sensors of the relative location system 130 and the enhanced 6dof audio system 140, rendering information for enhanced 6dof audio system 140, reality information from another device, such as over the Internet for example, or any other suitable device for inputting information into the system 200. The output(s) 230 may comprise, for example, a display on a VR headset of the visual system 110, speakers of the audio system 120, and a communications output to communication information to another device. The controller(s) 210 may comprise one or more processors 240 and one or more memory 250 having software 260 (or machine-readable instructions).

Figure 3:
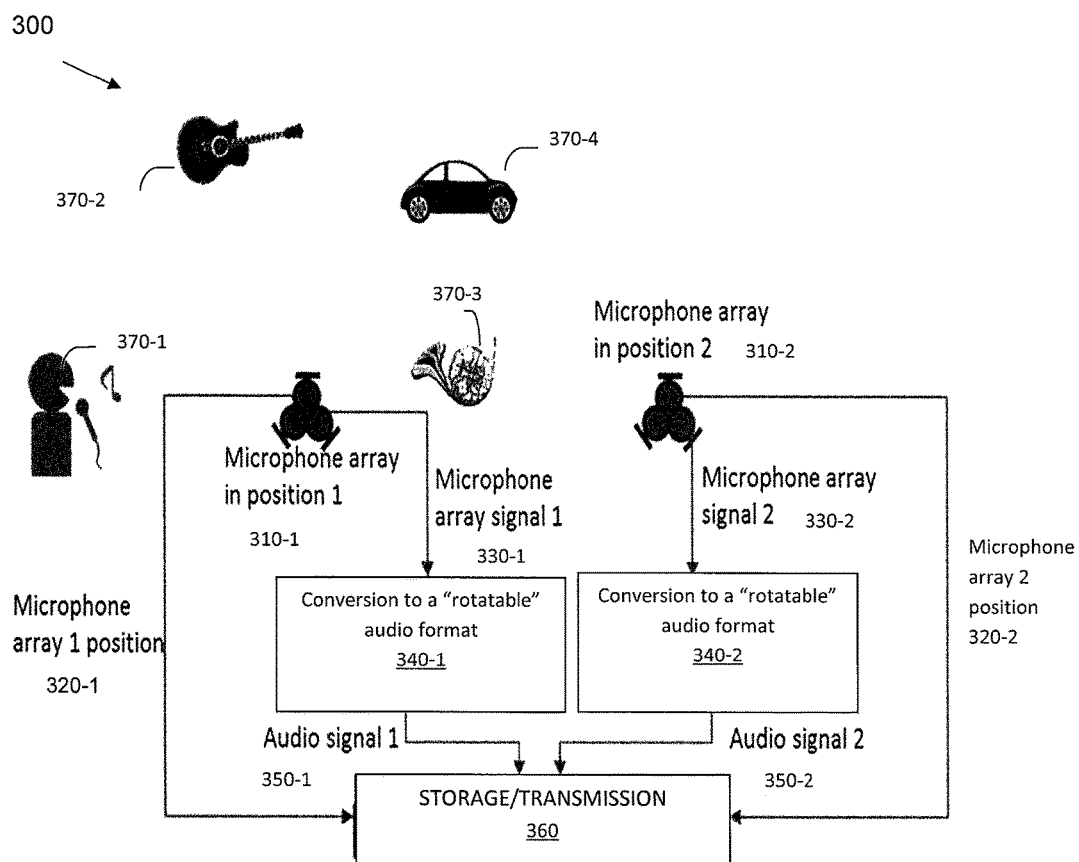
FIG. 3 is a diagram illustrating a six degree of freedom (6dof) audio capture arrangement.

Referring now to FIG. 3, there is shown an audio capture arrangement 300 for spatial audio, in this instance a 6dof audio capture setup. As shown in FIG. 3, audio capture arrangement 300 includes at least one microphone array 310 (shown as microphone arrays 310-1 in position 1 and 310-2 in position 2) and audio sources 370 (shown as audio source 370-1 to 370-4).

The 6dof audio capture setup 300 may include at least one microphone array. By way of illustration, two microphone arrays 310 (arrays 310-1 and 310-2) are shown, however, other example embodiments may include additional microphone arrays 310. As shown in FIG. 3, there may be at least one sound source, in this instance four (simultaneous) sound sources 370 (shown as sound sources 370-1 to 370-4), the locations of which are not known. Microphone signals 330 (shown as, respectively, microphone signals 330-1 and 330-2) from both arrays may be converted into a rotatable format 340 (shown as, respectively, 340-1 and 340-2). The rotatable (audio) format may be, for example, a format that may be rotated for head tracking and that has directional information that may be modified for a user listening to the captured content in a 6dof space. Suitable formats may include, for example, full sphere surround techniques, spatial audio, such as OZO audio (TM), etc. Converted audio signals 350 (shown as audio signal 1 350-1 and audio signal 2 350-2) and microphone array positions 320 (shown as microphone array 1 position 320-1 and microphone array 2 position 320-2) may be stored/transmitted 360.

Figure 4:
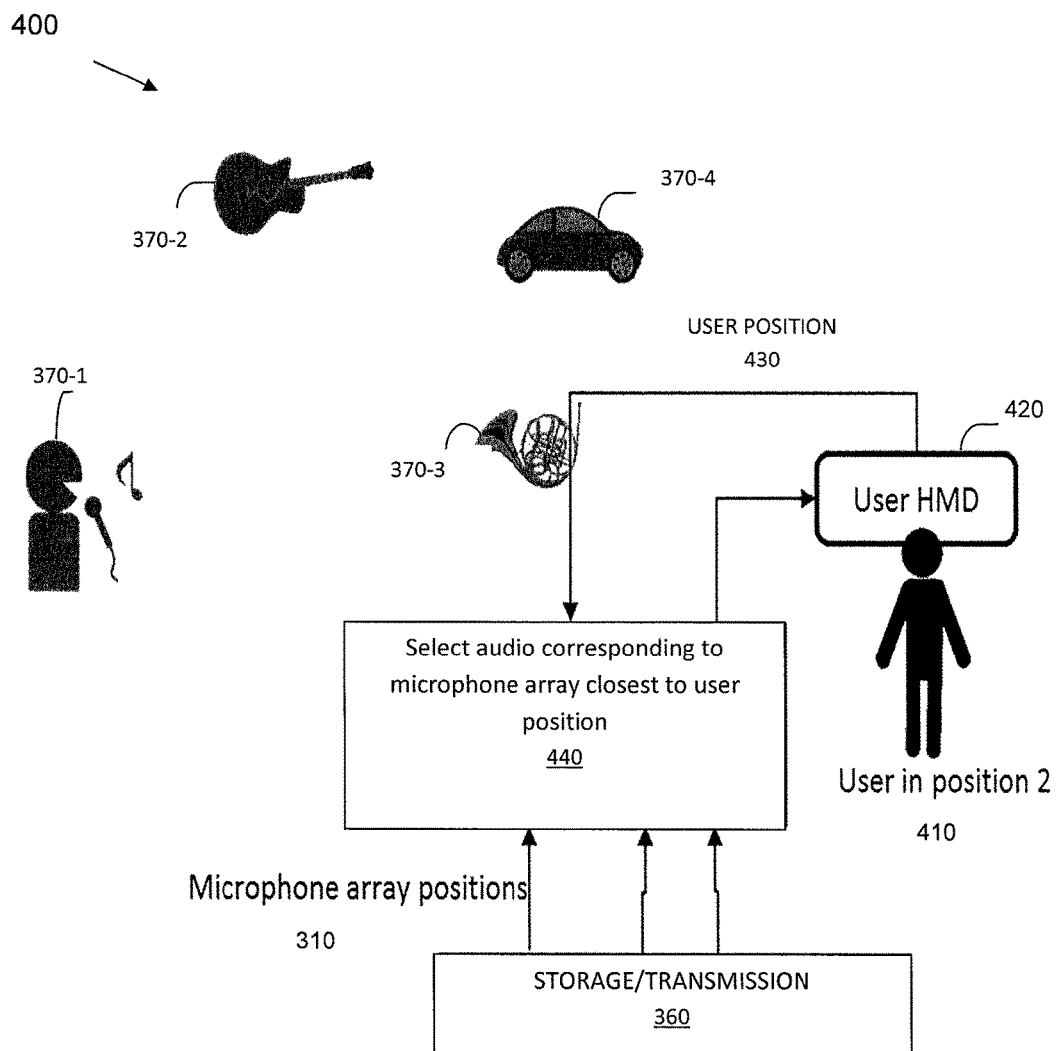
FIG. 4 is a diagram illustrating a user consuming captured 6dof audio content.

Referring now to FIG. 4, there is illustrated a user 410 consuming captured 3dof audio content. User 410 in position 2 includes a head mounted display (HMD) 420. The user 410 is in the same position (position 2) that microphone array 2 330-2 (as shown in FIG. 3) was previously located. In this example embodiment, because the user 410 does not move, playing back 3dof audio in this position may be more easily facilitated when compared to contrasting instances in which the user 410 is mobile. Reality system 100 may compare user position 430 to the microphone array positions 310 and chooses the audio signal with the closest position match 440 (for example, system 100 may select audio corresponding to microphone array closest to user position, in this instance microphone array 2 310-2) and play that audio to the user. User position 430 may be detected with a number of methods, for example, global positioning system (GPS), high accuracy indoor positioning (HAIP), accelerometers, camera based systems, light based systems, etc.

Figure 5:
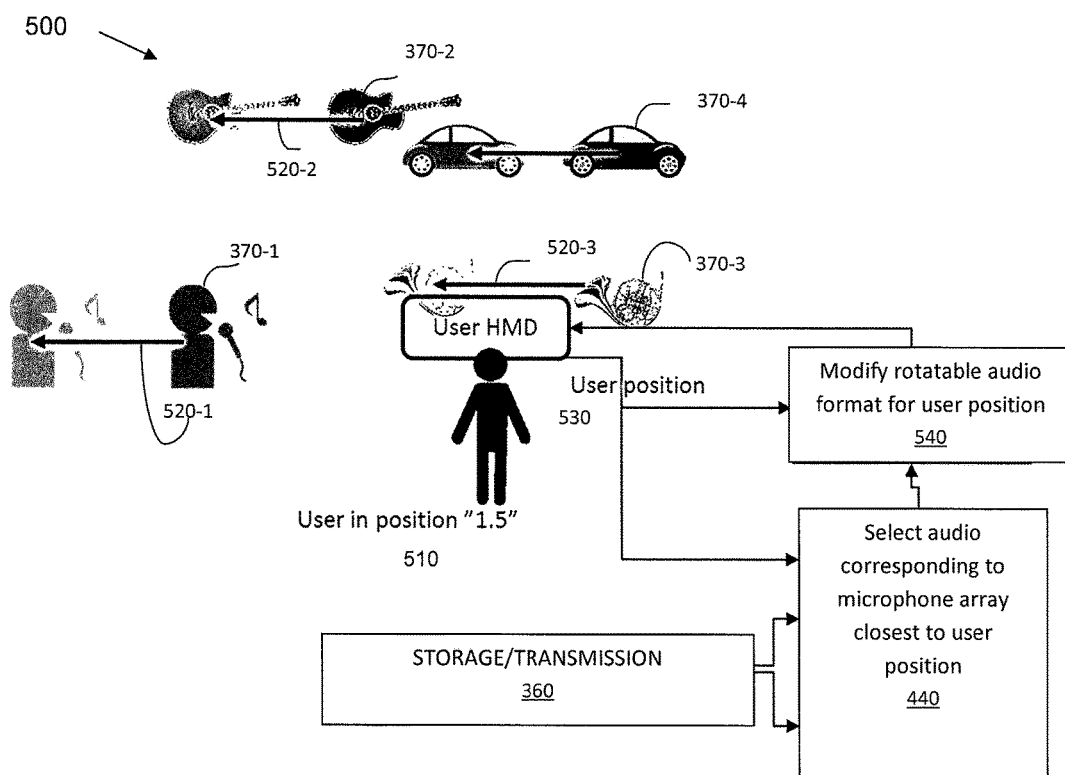
FIG. 5 is a diagram illustrating an example use case for 6dof audio.

Referring to FIG. 5, there is illustrated a user in a 6dof environment consuming captured audio content. The user is in a location (herein illustrated as position 1.5 510) that is between microphone array positions (between position 1 and position 2) in the original audio capture setup (microphone array 310 positions as described hereinabove with respect to FIG. 3). According to an example embodiment, all sound source 370 locations may be known and a microphone array signal may be modified to represent the correct locations when user moves in 6dof as shown in FIG. 5. However, in some example embodiments, information about the sound source locations may be unavailable (for example, because small microphone arrays may be unable to measure distances with usable accuracy).

According to another example embodiment, microphone arrays may be positioned at multiple locations (for example, everywhere), in an arrangement in which the user is always close enough to a microphone array location. However, this example embodiment may be prohibitive to implement as this may require too many microphone arrays and storing/transmitting the signal may take require an unacceptable overhead (for example, too many bits).

In some instances, the user may move into a position that is not one of the microphone array positions (for example the user may be in position "1.5" 510). In these instances, the captured audio from the microphone arrays may need to be modified 440 when the user has moved away from an array position. The user position 530 may be transmitted to be used in modifying the captured audio. This is because when the user moves, the sound source directions change. Sound source directions may be modified 440 based on a rotatable audio format for the new user position 440. However, because information regarding the distances from the microphone arrays to the sound sources 370 may be unavailable, the system 100 may be unable to modify the sound source directions 520 (520-1 to 520-4) accurately (for example, correctly) as the user moves in 6dof. The further the user moves, there may be a corresponding increase in problems associated with presenting audio sources 370 from correct directions.

Figure 6:
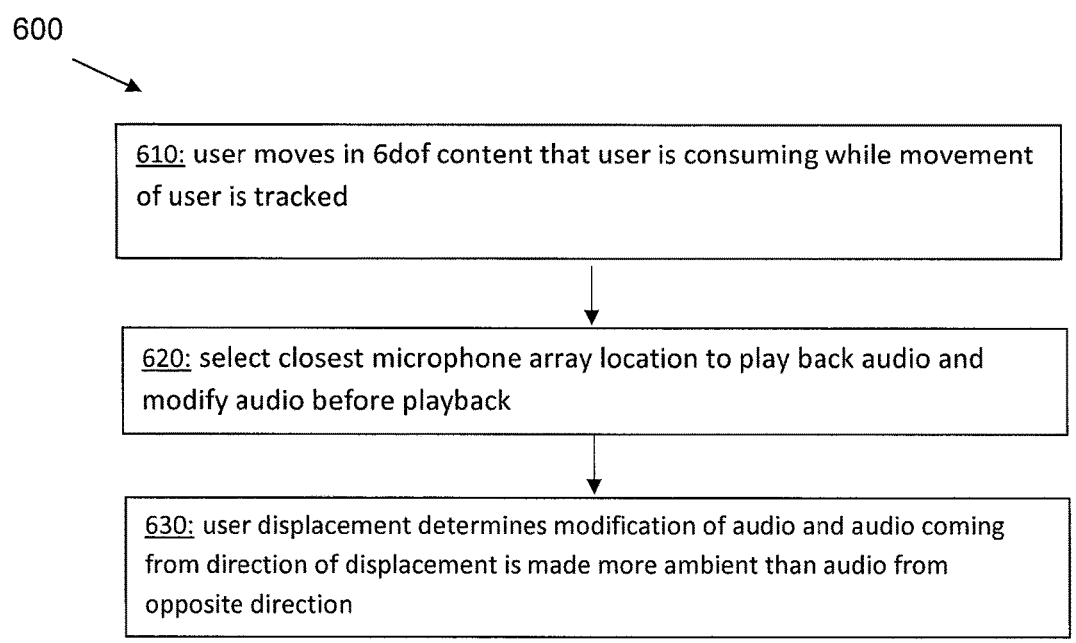
FIG. 6 is another diagram illustrating a flowchart of the use case for 6dof audio.

Referring now to FIG. 6, an example flow diagram 600 of a method in accordance with example embodiments which may be performed by an apparatus, for example, a reality rendering system 100 as described herein.

Example embodiments may provide methods for taking into account the probability of error in direction estimates for sound source direction and for making playback audio from high-probability error directions more ambient when a user is consuming 6dof audio content that has been captured with one or more microphone arrays in known locations.

The example embodiments may be implemented in to modify rotatable audio format for (for example, new) user position 540 block as described hereinabove with respect to FIG. 5. The example embodiments may provide a way to move sound source directions so that the sound sources are experienced by the user in a perceptually correct manner (for example, possible problems may be masked from the user).

Spatial audio may be captured using different methods. For example, in some example methods the spatial audio may be captured in a manner to give a parametric direction to audio. However, the example embodiments disclosed herein may be applied to other methods from which audio direction may be calculated.

According to an example method, audio may be presented as directional (mid) signal, ambient signal (side) and direction parameter alpha for each frequency band. Another example method may include directional audio coding (DirAC) and similar audio representation.

At block 610, the user may be consuming a content of a free-viewpoint audio environment (for example, at least audio and, in some instances, video). The content of the free-viewpoint audio environment may include 3dof plus content in which a user may not be mobile (for example, not be able to walk) but may be able to move their head (for example, slightly) to see around 3D object, 6dof content, etc. Alternatively (or additionally), the user may be moving in 6dof content (provided, for example, by system 100) that the user is consuming while movement of the user is tracked. The audio may be played to the user from a device using headphones (for example, a device incorporated with HMD 420. The device may, in some instances, be a mobile device.

The user may move in 6dof content by moving in either an actual environment of the user (for example, the real world) or a virtual environment. Real world movement may be tracked by the device using one or more of GPS, HAIP, accelerometers, camera-based systems, light-based systems, etc. Virtual reality (VR) movement may be initiated by user gestures or controls on the device. In both instances, the user may move in 6dof content that the user is consuming.

At block 620, system 100 may select a closest microphone array location to play back audio. The system may modify the audio before playback. The audio may have been captured in at least one location by a microphone array.

The audio for the 6dof content may have been recorded using microphone arrays in an identified location. When the user location in the 6dof content matches one of the array locations, audio may be played back based on the user location matching the particular array location. In instances in which the user is away from any microphone array location, the closest microphone array location may be used to playback audio to the user.

According to an example embodiment, when the user is in a position in the virtual environment that represents the location of the microphone array in real world corresponding to a time at which the audio was recorded, audio may be played back normally (for example, without additional modification).

At block 630, system 100 may determine the modification on the audio based on user displacement (including, for example, distance and direction) from the nearest microphone array. The audio may be made more ambient with increasing displacement (of the user from the nearest microphone array) and audio coming from the direction of the displacement may be made more ambient than audio coming from the opposite direction of the displacement.

Head tracking may be used to play back audio from correct directions in instances in which the user turns. The audio may have been captured as described in a manner that allows (6dof) playback in a 6dof environment and played back binaurally to the user. The user may be wearing a device, for example, head tracked headphones, head mounted display (HMD), augmented reality device (AR), smart glasses, etc. The device may process the audio for the user. When the user moves the audio may change to correspond to the new user position. Alternatively, an external device may track the user head orientation, for example via an external light based tracker.

The device may be a mobile device with headphones, a mobile device connected to a HMD and headphones, a PC with headphones, a PC connected to a surround speaker system, a game console, etc. Processing of rotatable audio, such as described with respect to conversion to a rotatable audio format 340, described herein above with respect to FIG. 3, may occur in places, devices and/or portions of the system, such as HMD, mobile device connected to a HMD, PC, etc.

When the sound sources are close even a small user displacement causes big changes to the directions of the sound sources. For example, the horn direction changes 180 degrees when user moves from position 1 to position 2.

Figure 7:
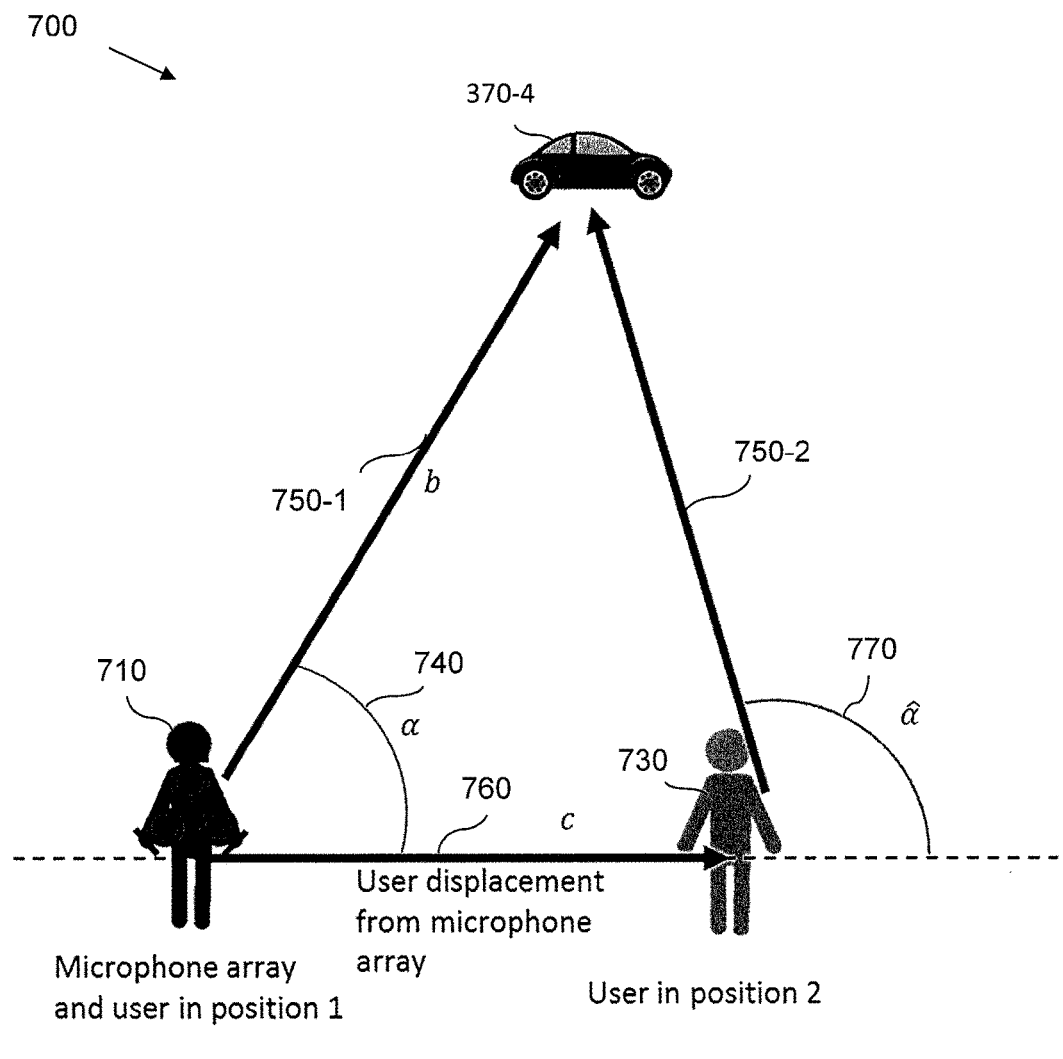
FIG. 7 is a diagram illustrating user displacement from a microphone array location.

FIG. 7 illustrates an instance (for example, a scenario) 700 in which a user moves away from the microphone array location, and audio directions are required to be changed to correspond to the new user position.

As shown in FIG. 7, a microphone array 710 and a user may be positioned (for example, at a position corresponding to an audio capture point of the array) in position 1 (for example, initially). The user may be in a position that the array was in the recording setup. When the user listens to the recorded 6dof audio, the array is no longer present. When the user is in the same position as the array, the user is in a position in a virtual world and the array was used to capture audio for the same position in the virtual world. At position 1, audio from sound source 370-4 (shown, by way of illustration, as an automobile) may be received in audio direction 750-1.

The device associated with the user (or system 100) may modify the audio directions in instances in which the user is displaced from the microphone array (760). According to an example embodiment, the device may change the sound direction angle α (740, in FIG. 7) in the following manner.

$$\hat{\alpha} = \frac{\pi}{2} - \sin^{-1} \frac{b \sin \alpha}{\sqrt[3]{c^2 + b^2 - 2cb c_{DS} \alpha}} \qquad \text{Equation (1)}$$

The derivation of Equation (1) is illustrated in FIG. 1.

In some instances, the distance between the user in position 1, 310-1 and the sound source 370-4, length b 750-1 may be unknown. The change in angle α 740 (in instances in which user displacement from microphone array 760 results in the user (being relocated) in position 2, 730) is dependent on the distance of the sound objects (or sound sources) 370 (car 370-4 in FIG. 7) from the user. The device may be unable to determine angle $\bar{\alpha}$ at position 2 770 because the uncertainty regarding the length b 750 from the sound source 370. In many instances, an assumption that length b 750 is fixed may be invalid. An illustration of the problem caused by length b 750 being unknown is shown in FIGS. 8 and 9.

Figure 8:
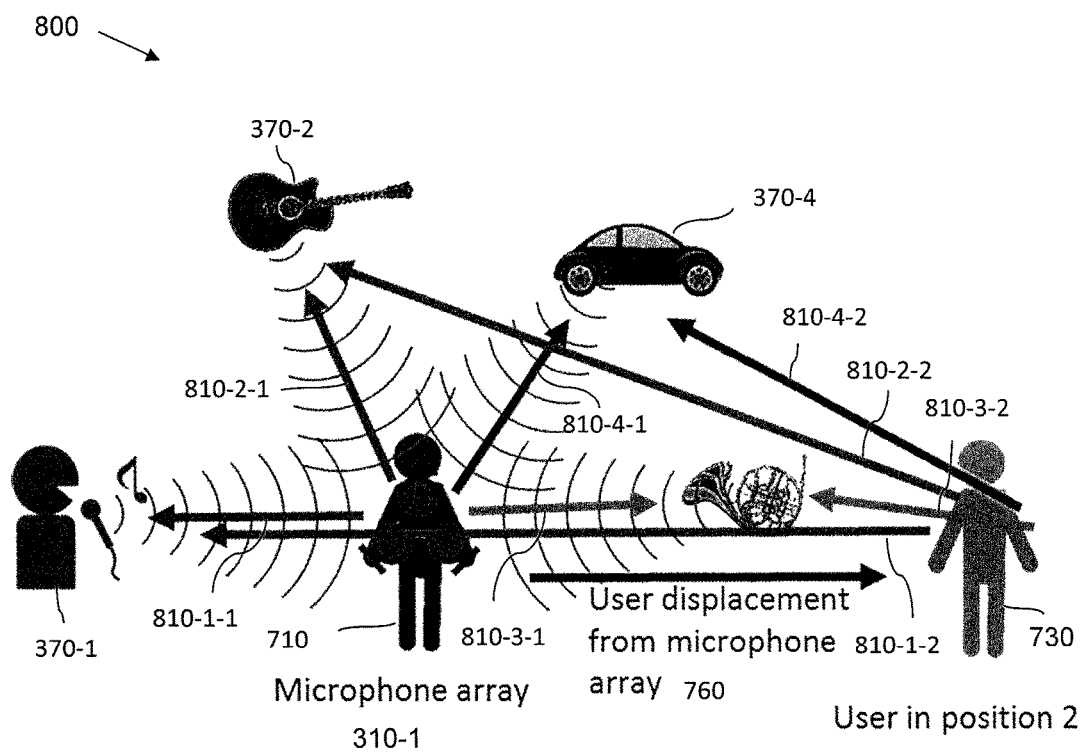
FIG. 8 is a diagram illustrating user displacement in an instance in which sound sources are close.

FIG. 8 illustrates a scenario 800 of user displacement in an instance in which sound sources are close. In this scenario 800 in which the sound sources (370) are close, even a small user displacement 760 may cause a corresponding large change(s) to the directions 810 (shown as 810-x-y to illustrate the corresponding sound source x and user position y, for example, 810-2-1 corresponds to sound source 370-2, the guitar from user position 1, 310-1) of the sound sources 370 (370-1 to 370-4). For example, the direction 810-3-1 from the user to the horn (370-2) may change 180 degrees (for example, to 810-3-2 as shown in FIG. 8, by way of illustration) when user moves from position 1 (710 or 310-1, at which the microphone array and user are collocated) to position 2 (730).

Figure 9:
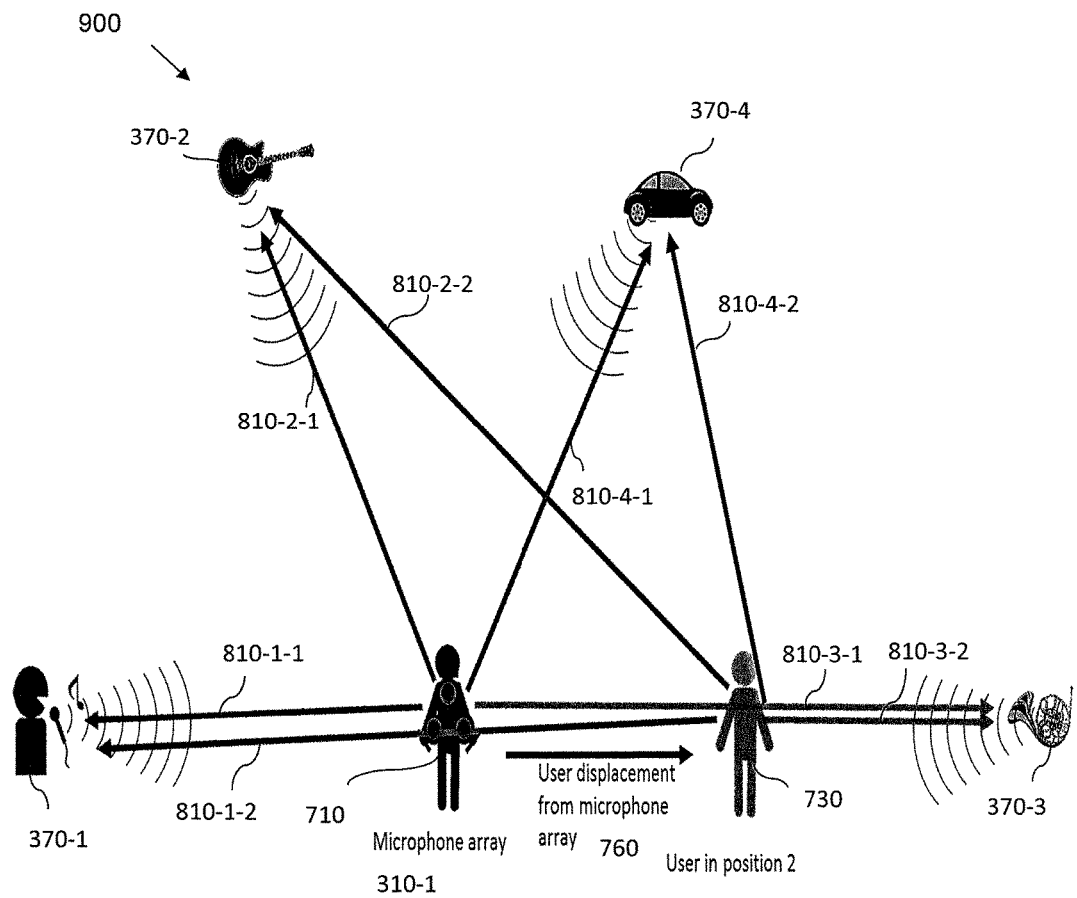
FIG. 9 is a diagram illustrating changes in sound source directions when the sound sources are far away from a user when a user moves.

FIG. 9 illustrates a scenario 900 of changes in sound source directions when the sound sources are far away from a user when a user moves. In a scenario 900 in which the sound sources 370 are further away the changes in sound source directions (810) may be smaller when user moves from position 1 (710) to position 2 (730).

As illustrated with regard to FIG. 8 and FIG. 9, sound sources 370 that are in the direction of the user displacement from the microphone array 760 are more likely to change their direction (for example, sound sources 370-3 and 370-4) drastically and sound sources in the direction opposite to user displacement (for example, sound sources 370-1 and 370-2) may change their direction relatively little or, in some instances, not change their direction.

According to example embodiments, the system 100 may play sounds that originate from the direction that the user has moved towards (for example, the direction that the user is moving away from the microphone array to) (for example, the user in FIG. 9 is moving away from the array) with an ambiguous direction. For example, sounds from that direction (for example, such as sounds from audio source 370-3) may be played back in a more ambient manner in which sound direction is not clear (instead of playing those sounds with a clear direction).

The system 100 may derive a formulation of the amount of ambiguity that is to be applied for sounds in each direction, for example, based on predetermined assumptions. The system 100 may make assumptions regarding the nearest distance and a furthest (for example, far) distance for the sound sources 370 from the user. The system 100 may have a larger margin of error in selecting the far distance as a large enough number may provide a sufficiently accurate result for all sound sources from that distance up to infinity. The near distance may be a fixed value or may depend on the type of (for example, 360) camera that was used because in many instances for 360 cameras there is a range within which stitching (for example, combining videos with the overlapping fields in order to create a panorama video) does not work well for close-by objects. The near distance may be the closest distance at which 360 stitching works to an acceptable level of perception because, in many instances, content creators may avoid putting objects closer to the camera than that acceptable level of perception of the 360 stitched video. According to an example embodiment, the near distance may be 1 m and the far distance may be 10 m. By way of illustration, FIG. 8 may correspond to the near distance case and FIG. 9 may correspond to the far distance case. The system 100 may determine an uncertainty value by comparing the sound source directions in the near distance and far distance cases to get an uncertainty value for each direction.

Figure 10:
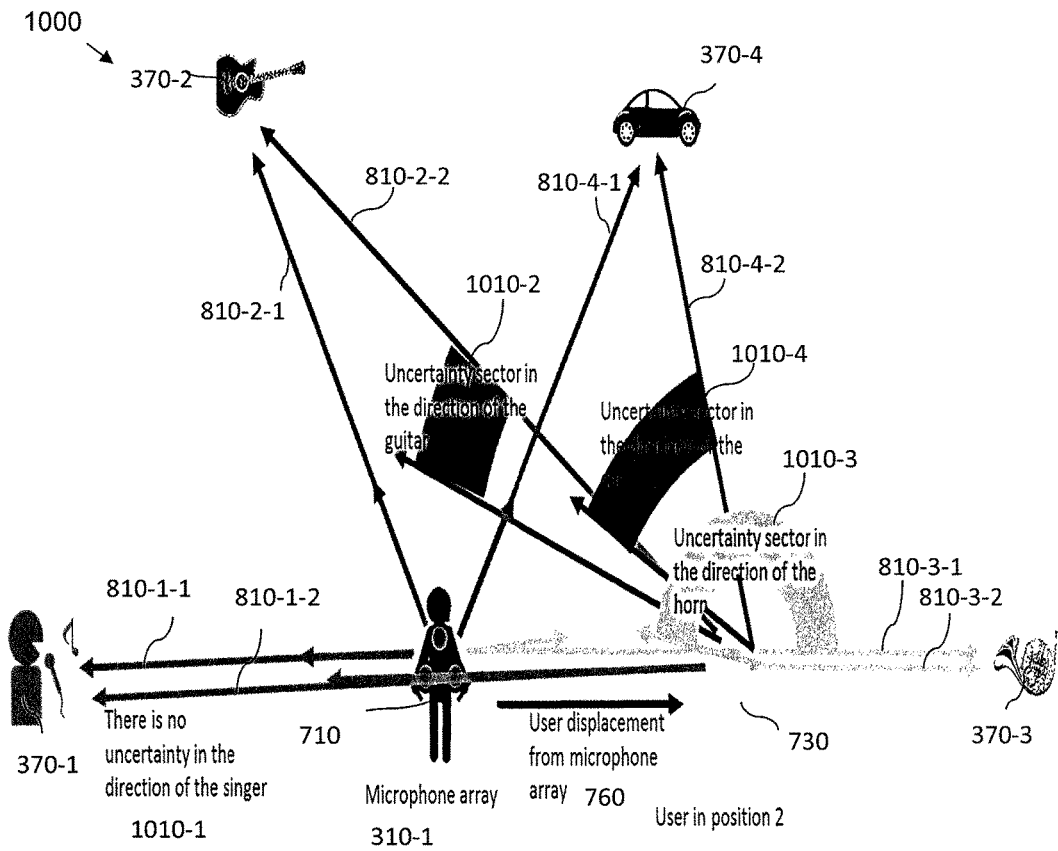
FIG. 10 is a diagram illustrating the uncertainty value.

FIG. 10 illustrates a scenario 1000 including the uncertainty sectors 1010. Uncertainty sectors 1010 in the direction of each of the sound sources 370 are shown as respectively 1010-1 to 1010-4.

The uncertainty value is the difference in directions calculated based on an assumption that the sound source 370 in a direction is near or far (for example, 1 or 10 meters away).

Expressed mathematically, the uncertainty value for direction $\alpha$ is:

$$= \sin^{-1} \frac{10 \text{ m} \sin\alpha}{\sqrt[2]{c^2 + (10 \text{ m})^2 - 2c(10 \text{ m})\cos\alpha}} - \sin^{-1} \frac{(1 \text{ m})\sin\alpha}{\sqrt[2]{c^2 + (1 \text{ m})^2 - 2c(1 \text{ m})\cos\alpha}} \quad \text{Equation (2)}$$

The value of the uncertainty $\alpha$ may be limited between 0 and $\pi$. The maximum error from Equation (2) is Pi.

According to example embodiments, the audio signal may be divided into time-frequency tiles. For each tile there may be a direction $\alpha$. For each tile the system 100 (or device) may calculate the uncertainty depending on the user position and $\alpha$. The device may modify audio in the tiles in which uncertainty is larger than zero or larger than a threshold, for example $\pi/18$. In some embodiments, the threshold for modifying tiles may be dependent on human hearing directional accuracy. The audio may be made more ambient and less directional in these tiles. For example, the system 100 may apply different methods to make the audio more ambient and less directional, such as an adjustment and/or modification of the direct-to-reverberant ratio (DRR), decorrelation of the signal to make it more ambient, etc.

Direction $\alpha$ may be modified in each tile to be in the middle of the uncertainty sector 1010. The tile sound may be created using a mix of direct and ambient signals. If the uncertainty is $\pi$, then only ambient signal is used in the mix and if the uncertainty value is 0, then only direct signal is used. Other ratios of ambient and direct may also be used in the mix, based on a correlation between the higher the uncertainty is the more ambient signal is used.

According to an example embodiment, the system 100 may apply directional audio coding (DirAC) including a direct to ambient ratio parameter. The system 100 may modify the direction angle as described herein above (preceding paragraph) but the ambient effect (for example, ambient like nature) may achieved by setting the direct to ambient ratio lower as the width of the sector increase (for example, the wider the sector is). According to an example, if the sector is $\pi$, the ratio is 0 and if the sector is 0 the ratio is a large value, for example, 1000.

In addition to changing the sound source directions, the system 100 may make sounds louder when user moves towards them and attenuate sounds when user moves away from the sounds. However, the distance to the sources may be unknown and therefore the system 100 may be unable to determine exact attenuation/amplification values. The system 100 may instead amplify sounds in the direction of the displacement only for short displacements and keep the volume unchanged from longer distances. Sounds in the opposite direction of the displacement may be attenuated for somewhat longer displacements and kept the same after that. According to an example embodiment, the system 100 may amplify sounds in the direction of the displacement in the order of (a predetermined level, for example, approximately) 6 dB when the user moves (a predetermined distance) 1 m away from the array location and may keep the sound unchanged beyond that (threshold value). Sounds in the opposite direction may be attenuated (in the order of a second predetermined level, for example, approximately) 12 dB when the user moves (another predetermined distance) 2 m away from the array location and kept unchanged after that. In other directions values between these two extremes may be used, for example, 9 dB and 1.5 m. Alternatively, the system 100 may assume (receive an instruction) a distance for the sound sources and the sound source levels may be changed based on the assumed distance.

According to an example embodiment, there may be some measurement error in the detection of the sound source directions. For directions that are near the user displacement direction the uncertainty sector 1010 may be doubled to cover the other side of the circle as well. In some instances, those tiles whose direction $\alpha$ differs less than $\pi/18$ from the user displacement direction, the system 100 may increase (for example, double) the uncertainty sector 1010. The doubling may be done because the measurement error may make it highly difficult (for example, impossible) to determine which side of the instrument the user is when the user has moved away from the microphone array position. Transmitting the sound (and, consequently the user hearing the sound) from all around masks this error. The ambience modification may remain unchanged in case the sector is doubled. Direction α may be modified in each tile to be in the middle of the doubled uncertainty sector 1010.

Figure 11:
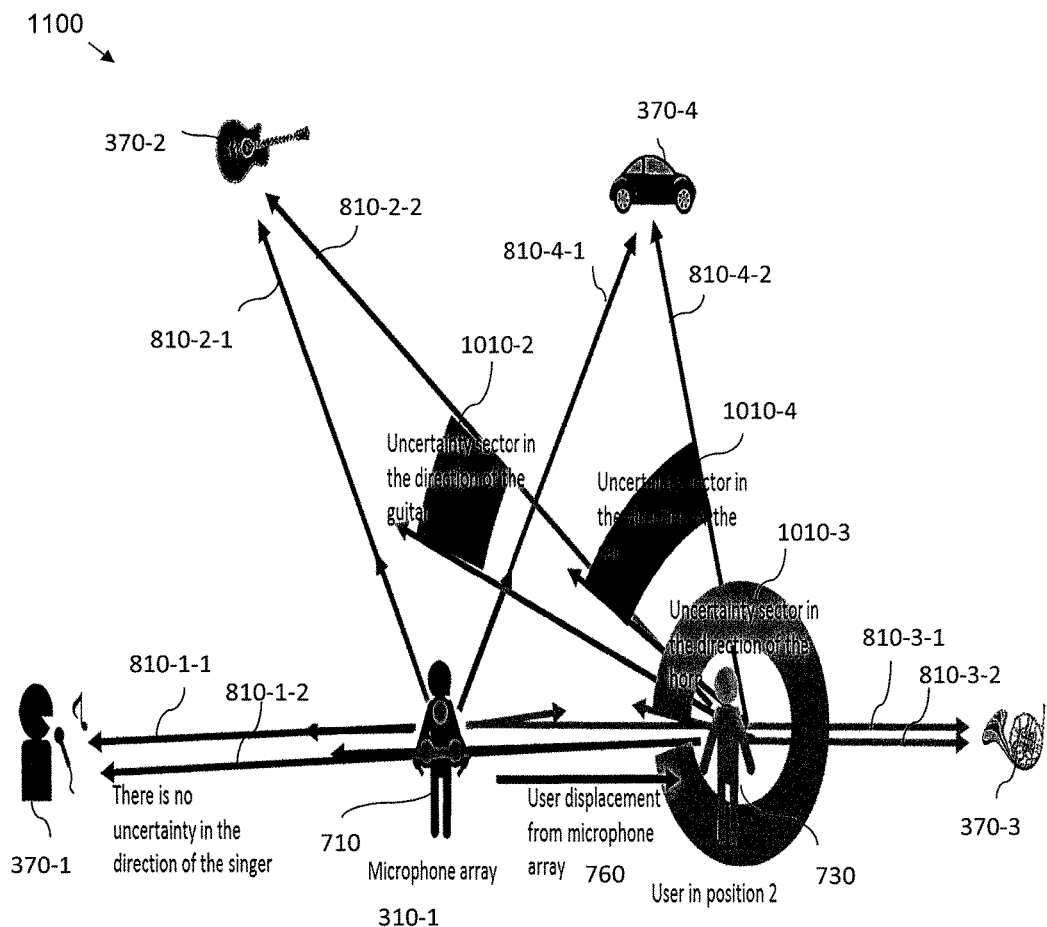
FIG. 11 illustrates how the uncertainty sector is doubled to the other side of the circle in an instance in which the sound source (horn) is near user displacement direction.

FIG. 11 illustrates how the uncertainty sector is doubled to the other side of the circle in instances in which the sound source (horn) 370-2 is near user displacement direction. FIG. 11 may be contrasted with FIG. 10.

In instances in which there is more than one microphone array in different locations, the closest array may be used.

As described herein, the figures and formulas are presented assuming that all user movement and sound sources are on a plane, however, this may easily be extended to three dimensions (3D).

In the example embodiments described hereinabove, the system 100 uses the nearest microphone array. However, other aspects may affect the choice of the array. For example, if the nearest microphone array in the 6dof environment is in another room (or in some way obscured), the system 100 may use an array that is in the same room (or that is unobstructed or obscured).

FIG. 12 is example flow diagram 1200 illustrating a process of using direction uncertainty when creating virtual listening positions. Process 1200 may be performed by a device (or devices) associated with rendering 6dof audio.

At block 1210, the system 100 may access location corresponding to at least one microphone array in a content of a free-viewpoint audio environment. For example, the system 100 may access the location of microphones in 6dof content. For example, the device may include a memory with location of microphone arrays in 6dof content.

At block 1220, the system 100 may track user movement of a user based on a user position in the content of the free-viewpoint audio environment. For example, the system 100 may user movement in the 6dof content. For example, the system 100 may track user movement using global positioning system (GPS), high accuracy indoor positioning (HAIP), accelerometers, camera based systems, light based systems, etc.

At block 1230, the system 100 may determine user displacement from nearest microphone array. For example, the system 100 may compare a location of the user to a location of the nearest microphone array. The system 100 may determine the nearest microphone array based on a comparison of distances between the user and the different microphone arrays.

At block 1240, the system 100 may determine a probability of error in a direction estimate from at least one sound source. For example, the system 100 may determine a probability of error in a direction estimate from at least one part of an audio signal. Part of an audio signal in this instance may include at least one frequency band or at least one audio object of a weighted sum of audio objects, where the weighted sum is the mixing of audio objects to create a loudspeaker signal.

At block 1250, the system 100 may apply audio ambience to the at least one sound source based on the user displacement from the nearest microphone array of the at least one microphone array and the probability of error in the direction estimate from the at least one sound source. The system 100 may determine audio ambience based on the displacement from the audio sources. For example, the system 100 may increase audio ambience with displacement and audio ambience that is associated with audio from direction of displacement may be made more ambient than audio from opposite direction. The system 100 may make playback audio from high-probability error directions more ambient than playback audio from low-probability error directions.

According to an example embodiment, in an instance in which there are separate sound objects in separate tracks, the system 100 may then apply ambience to all the objects that have enough uncertainty. For example, the system 100 may apply ambience to all the objects except the ones that are in the opposite direction of the displacement. The amount of ambience is dependent of the object direction, more ambience to objects that are close to the direction of displacement.

According to another example embodiment, the audio may be in a form in which each time-frequency tile has a direction and the tiles are treated like objects above, for example, the tiles whose direction is in the direction of displacement are added more ambience. In this instance, those tiles whose direction is opposite to the direction of displacement may not have any ambience added to them.

According to an example embodiment, at least one audio object may include direction in metadata and not include distance in the metadata. In this instance, the playback level of the object may be the same as the object level in the track. For example, further away tracks may have a lower level than tracks belonging to objects that are close by. In this way the playback level may be automatically correct in normal playback scenarios (for example, playback scenarios other than 3dof, nor 6dof) and therefore no distance metadata may be needed in normal playback. With such objects, the example embodiments may be useful in 3dof, 3dof+, and 6dof playback. The objects may be either in separate tracks or may be transported in the form of an MPEG spatial audio object coding (SOAC) bit-stream.

In addition to processing that adds (and/or adjusts) ambience as described herein, further processing may be implemented in accordance with the example embodiments described herein. For example, further example embodiments may add (and/or adjust) reverberation and add (and/or adjust) spatial extent.

Features as described herein may provide technical advantages and/or enhance the end-user experience. For example, the system may ensure that when the user moves in a 6dof scene, no audio source comes from a clearly wrong direction. The system may allow an arrangement in which fewer microphone arrays are needed with a minimal impact on quality.

Another benefit of the example embodiments is that the system may require less complexity for providing audio with directional uncertainty when implementing virtual listening positions when compared to solutions using audio object separation. The system may provide a solution in which quality issues are relatively masked as compared to audio provided via audio object separation (for example, problems with audio determined by audio object separation may be more apparent).

An example method may comprise accessing, by a user device, a location corresponding to at least one microphone array in a content of a free-viewpoint audio environment, tracking user movement of a user based on a user position in the content of the free-viewpoint audio environment, determining user displacement from a nearest microphone array of the at least one microphone array, determining a probability of error in a direction estimate from at least one part of an audio signal and determining audio ambience based on the user displacement from the nearest microphone array of the at least one microphone array.

In accordance with the example embodiments as described in the paragraphs above, increasing audio ambience with the user displacement and making audio from direction of the user displacement more ambient than audio from opposite direction.

In accordance with the example embodiments as described in the paragraphs above, tracking the user movement based on at least one of global positioning system, high accuracy indoor positioning, at least one accelerometer, at least one camera based system, and at least one light based system.

In accordance with the example embodiments as described in the paragraphs above, making playback audio from high-probability error directions more ambient than playback audio from low-probability error directions.

In accordance with the example embodiments as described in the paragraphs above, wherein the six degree of freedom content includes a virtual environment and tracking the user movement comprises tracking virtual movement of the user.

In accordance with the example embodiments as described in the paragraphs above, wherein the six degree of freedom content includes a real world environment and tracking the user movement comprises tracking movement of the user in a real world environment.

In accordance with the example embodiments as described in the paragraphs above, presenting audio as a directional signal, an ambient signal and direction parameter alpha for each frequency band.

In accordance with the example embodiments as described in the paragraphs above, presenting audio via directional audio coding.

In accordance with the example embodiments as described in the paragraphs above, determining an amount of ambiguity based on a near distance and a far distance, wherein the near distance is a closest distance at which 360 stitching starts to work.

In accordance with the example embodiments as described in the paragraphs above, $$\text{uncertainty for direction } \alpha = \sin^{-1}\frac{10 \text{ m}\sin\alpha}{\sqrt[2]{c^2 + (10 \text{ m})^2 - 2c(10 \text{ m})\cos\alpha}} - \sin^{-1}\frac{(1 \text{ m})\sin\alpha}{\sqrt[2]{c^2 + (1 \text{ m})^2 - 2c(1 \text{ m})\cos\alpha}}.$$

In accordance with the example embodiments as described in the paragraphs above, modifying audio in tiles in which uncertainty is larger than a threshold.

An example apparatus may comprise at least one processor; and at least one non-transitory memory including computer program code, the at least one memory and the computer program code configured to, with the at least one processor, cause the apparatus to: access, by a user device, a location corresponding to at least one microphone array in a content of a free-viewpoint audio environment, track user movement of a user based on a user position in the content of the free-viewpoint audio environment, determine user displacement from a nearest microphone array of the at least one microphone array, determine a probability of error in a direction estimate from at least one part of an audio signal and determine audio ambience based on the user displacement from the nearest microphone array of the at least one microphone array.

In accordance with the example embodiments as described in the paragraphs above, increase audio ambience with the user displacement and making audio from direction of the user displacement more ambient than audio from opposite direction.

In accordance with the example embodiments as described in the paragraphs above, track the user movement based on at least one of global positioning system, high accuracy indoor positioning, at least one accelerometer, at least one camera based system, and at least one light based system.

In accordance with the example embodiments as described in the paragraphs above, make playback audio from high-probability error directions more ambient than playback audio from low-probability error directions.

In accordance with the example embodiments as described in the paragraphs above, wherein the six degree of freedom content includes a virtual environment and tracking the user movement comprises tracking virtual movement of the user.

In accordance with the example embodiments as described in the paragraphs above, present audio as a directional signal, an ambient signal and direction parameter alpha for each frequency band.

In accordance with the example embodiments as described in the paragraphs above, determine an amount of ambiguity based on a near distance and a far distance, wherein the near distance is a closest distance at which 360 stitching starts to work.

In accordance with the example embodiments as described in the paragraphs above, modify audio in tiles in which uncertainty is larger than a threshold.

An example apparatus may be provided in a non-transitory program storage device, such as memory 250 shown in FIG. 2 for example, readable by a machine, tangibly embodying a program of instructions executable by the machine for performing operations, the operations comprising: capturing, by an augmented reality (AR) device.

In accordance with another example, an example apparatus comprises: means for accessing, by a user device, a location corresponding to at least one microphone array in a content of a free-viewpoint audio environment, means for tracking user movement of a user based on a user position in the content of the free-viewpoint audio environment, means for determining user displacement from a nearest microphone array of the at least one microphone array, means for determining a probability of error in a direction estimate from at least one part of an audio signal and means for determining audio ambience based on the user displacement from the nearest microphone array of the at least one microphone array.

In accordance with the example embodiments as described in the paragraphs above, means for increasing audio ambience with the user displacement and making audio from direction of the user displacement more ambient than audio from opposite direction.

In accordance with the example embodiments as described in the paragraphs above, means for tracking the user movement based on at least one of global positioning system, high accuracy indoor positioning, at least one accelerometer, at least one camera based system, and at least one light based system.

In accordance with the example embodiments as described in the paragraphs above, means for making playback audio from high-probability error directions more ambient than playback audio from low-probability error directions.

In accordance with the example embodiments as described in the paragraphs above, wherein the six degree of freedom content includes a virtual environment and tracking the user movement comprises tracking virtual movement of the user.

In accordance with the example embodiments as described in the paragraphs above, means for presenting audio as a directional signal, an ambient signal and direction parameter alpha for each frequency band.

In accordance with the example embodiments as described in the paragraphs above, means for determining an amount of ambiguity based on a near distance and a far distance, wherein the near distance is a closest distance at which 360 stitching starts to work.

In accordance with the example embodiments as described in the paragraphs above, means for modifying audio in tiles in which uncertainty is larger than a threshold.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   accessing, by a user device, a location corresponding to at least one microphone array in a content of a free-viewpoint audio environment;
   tracking user movement of a user based on a user position in the content of the free-viewpoint audio environment;
   determining user displacement from a nearest microphone array of the at least one microphone array;
   determining a probability of error in a direction estimate from at least one part of an audio signal; and
   applying audio ambience to the at least one part of the audio signal based on the user displacement from the nearest microphone array of the at least one microphone array and the probability of error in the direction estimate from the at least one part of the audio signal.

2. The method as in claim 1, wherein applying audio ambience to the at least one part of the audio signal further comprises:
   increasing audio ambience with the user displacement and making audio from direction of the user displacement more ambient than audio from an opposite direction.

3. The method as in claim 1, wherein tracking user movement in the content of the free-viewpoint audio environment further comprises:
   tracking the user movement based on at least one of: global positioning system, high accuracy indoor positioning, at least one accelerometer, at least one camera based system, or at least one light based system.

4. The method as in claim 1, further comprising:
   making playback audio from high-probability error directions more ambient than playback audio from low-probability error directions.

5. The method as in claim 1, wherein the content of the free-viewpoint audio environment includes a virtual environment and tracking the user movement comprises tracking virtual movement of the user.

6. The method as in claim 1, wherein the content of the free-viewpoint audio environment comprises a real world environment and tracking the user movement comprises tracking movement of the user in the real world environment.

7. The method as in claim 1, further comprising:
   presenting audio as a directional signal, an ambient signal and direction parameter for each frequency band.

8. The method as in claim 1, further comprising:
   presenting audio via directional audio coding.

9. The method as in claim 1, wherein the applying of the audio ambience comprises determining the audio ambience based on the user displacement, and the method further comprises:
   determining an amount of ambiguity based on a near distance and a far distance, wherein the near distance is a closest distance at which 360 stitching starts to work.

10. An apparatus comprising:
    at least one processor; and
    at least one non-transitory memory including computer program code, the at least one memory and the computer program code configured to, with the at least one processor, cause the apparatus to:
    access a location corresponding to at least one microphone array in a content of a free-viewpoint audio environment;
    track user movement of a user based on a user position in the content of the free-viewpoint audio environment;
    determine user displacement from a nearest microphone array of the at least one microphone array;
    determine a probability of error in a direction estimate from at least one part of an audio signal; and
    apply audio ambience to the at least one part of the audio signal based on the user displacement from the nearest microphone array of the at least one microphone array and the probability of error in the direction estimate from the at least one part of the audio signal.

11. An apparatus as in claim 10, wherein, when determining audio ambience based on the user displacement from the nearest microphone array, the at least one memory and the computer program code are configured to, with the at least one processor, cause the apparatus to:
    increase audio ambience with the user displacement and make audio from direction of the user displacement more ambient than audio from opposite direction.

12. An apparatus as in claim 10, wherein, when tracking user movement in the content of the free-viewpoint audio environment, the at least one memory and the computer program code are configured to, with the at least one processor, cause the apparatus to:

track the user movement based on at least one of: global positioning system, high accuracy indoor positioning, at least one accelerometer, at least one camera based system, or at least one light based system.

13. An apparatus as in claim 10, wherein the at least one memory and the computer program code are further configured to, with the at least one processor, cause the apparatus to:

make playback audio from high-probability error directions more ambient than playback audio from low-probability error directions.

14. An apparatus as in claim 10, wherein the content of the free-viewpoint audio environment comprises a virtual environment and tracking the user movement comprises tracking virtual movement of the user.

15. An apparatus as in claim 10, wherein the at least one memory and the computer program code are further configured to, with the at least one processor, cause the apparatus to:

present audio as a directional signal, an ambient signal and direction parameter for each frequency band.

16. An apparatus as in claim 10, wherein, when determining audio ambience based on the user displacement, the at least one memory and the computer program code are configured to, with the at least one processor, cause the apparatus to:

determine an amount of ambiguity based on a near distance and a far distance, wherein the near distance is a closest distance at which 360 stitching starts to work.

17. An apparatus as in claim 10, wherein the at least one memory and the computer program code are further configured to, with the at least one processor, cause the apparatus to:

modify audio in tiles in which uncertainty is larger than a threshold.

18. A non-transitory program storage device readable by a machine, tangibly embodying a program of instructions executable by the machine for performing operations, the operations comprising:

accessing, by a user device, a location corresponding to at least one microphone array in a content of a free-viewpoint audio environment;

tracking user movement of a user based on a user position in the content of the free-viewpoint audio environment;

determining user displacement from a nearest microphone array of the at least one microphone array;

determining a probability of error in a direction estimate from at least one part of an audio signal; and applying audio ambience to the at least one part of the audio signal based on the user displacement from the nearest microphone array of the at least one microphone array and the probability of error in the direction estimate from the at least one part of the audio signal.

* * * * *